United States Patent [19]

Fennema et al.

[11] Patent Number: 5,499,231

[45] Date of Patent: Mar. 12, 1996

[54] OPTICAL DISK DRIVE WITH MULTIPLE DATA LAYER DISK AND SYSTEM FOR FOCUSING THE OPTICAL BEAM

[75] Inventors: Alan A. Fennema, Tucson, Ariz.; Wayne I. Imaino, San Jose; Hal J. Rosen, Los Gatos, both of Calif.

[73] Assignee: International Business Machines Corporation, Armonk, N.Y.

[21] Appl. No.: 339,626

[22] Filed: Nov. 15, 1994

[51] Int. Cl.⁶ .................................................. G11B 7/00
[52] U.S. Cl. ..................... 369/124; 369/94; 369/110; 369/112; 369/275.1; 365/127
[58] Field of Search ............................ 369/110, 94, 95, 369/100, 103, 108, 109, 111, 112, 124, 275.1, 275.3, 44.23, 44.26; 365/127

[56] References Cited

U.S. PATENT DOCUMENTS

| | | | |
|---|---|---|---|
| 4,090,031 | 5/1978 | Russell | 358/130 |
| 4,450,553 | 5/1984 | Holster et al. | 369/275 |
| 5,202,875 | 4/1993 | Rosen et al. | 369/94 |
| 5,251,198 | 10/1993 | Strickler | 369/110 |
| 5,255,262 | 10/1993 | Best et al. | 369/275.1 |
| 5,381,401 | 1/1995 | Best et al. | 369/275.1 |
| 5,408,453 | 4/1995 | Holtslag et al. | 369/112 |

*Primary Examiner*—Loha Ben
*Attorney, Agent, or Firm*—Thomas R. Berthold

[57] ABSTRACT

An optical disk drive with a multiple data layer optical disk uses computed axial velocity values of the data layers to optimize the interlayer transition of the focused light beam. In the preferred embodiment, the axial velocities of the data layers are computed for a set of radial and angular positions on the data layer surfaces using one of several techniques. The data layer axial velocity values are computed from the measured current values to the voice coil motor focus actuator or from the output of the detector that generates the focus error signal (FES). A routine is run at disk drive startup, or at various times during disk drive operation, to measure the coil current or FES at different radial and angular positions and compute the axial velocity values. The computed axial velocity values are then mapped into memory storage according to addresses corresponding to their radial and angular positions. When it is desired to move the focused light beam from one data layer (the initial or take-off data layer) to another data layer (the final or target data layer) the computed axial velocity values are retrieved for the radial and angular positions nearest the take-off and target sectors on the respective data layers. These velocity values are then used to modify the acceleration profile of the focusing lens so that the focused light beam arrives at the desired position on the target data layer with a velocity close to the target data layer axial velocity.

23 Claims, 5 Drawing Sheets

OPTICAL DISK DRIVE WITH MULTIPLE DATA LAYER DISK AND SYSTEM FOR FOCUSING THE OPTICAL BEAM

TECHNICAL FIELD

This invention relates generally to optical disk drives with disks that have multiple data storage layers, and more specifically to such a drive with an improved system for focusing the optical beam to the different data layers.

BACKGROUND OF THE INVENTION

Optical disk data storage systems enable the storage of great quantities of data on a disk. The data is accessed by focusing a laser beam onto the data layer of the disk and then detecting the reflected light beam. The data is represented by changes in reflectivity. Various kinds of systems are known. In a ROM (Read Only Memory) system, such as a compact disk system (CD-ROM), data is permanently embedded as marks in the disk at the time of manufacture of the disk. The data is detected as a change in reflectivity as the laser beam passes over the data marks. A WORM (Write-Once Read-Many) system allows the user to write data by making marks, such as pits, on a blank optical disk surface. Once the data is recorded onto: the WORM disk it cannot be erased. The data in a WORM system is also detected as a change in reflectivity. There are also erasable optical data storage systems, such as phase change and magneto-optic (M-O) systems. While phase change systems also read data by sensing a change in reflectivity, M-O systems read data by measuring the rotation of the incident polarization caused by the M-O media.

To increase the storage capacity of an optical disk, multiple data layer systems have been proposed. An optical disk having two or more data layers may be accessed at different layers by changing the focal position of the lens. IBM's U.S. Pat. No. 5,202,875 describes a multiple dam layer system wherein the optical medium comprises either a plurality of substrates spaced apart by air gaps or a plurality of laminated substrates, each of the substrates having a data layer. U.S. Pat. No. 4,450,553 assigned to U.S. Philips, uses laminated disk substrates that are bonded together without an air gap, with each substrate supporting a CD-ROM type data layer. In such systems, the focused light spot from the laser source must be able to be positioned from one data layer to any other data layer to read and/or write data to the different data layers.

For a conventional single data layer optical disk drive, the focus acquisition time for the optical spot on the data layer is achieved from a stationary starting position of the focusing lens while the disk moves up and down at some relative velocity due to its vertical or axial runout. In this case, the focus acquisition time does not have to be fast since it is done only once at disk drive startup. This time is typically about 1 second for conventional CD-ROM and high-performance optical disk drives. However, for multiple data layer disks, this long focus acquisition time when switching between data layers is not acceptable because it results in excessively long data access times for data on the different data layers. The time to acquire focus when switching from one data layer to another should be as small as possible and optimally significantly less than the data access time within a given data layer. The data access times for CD-ROM drives is about 200 ms and for high-performance optical disk drives about 30 ms. The switching between data layers in a multiple layer disk drive is complicated by the fact that the data layers are not perfect planes that remain perfectly parallel with one another. Instead they generally have considerable axial runout and are not necessarily separated by a fixed spacing distance. In particular with respect to the multiple data layer disk where the individual substrates are separated by air gaps, the actual spacing between two separate data layers varies as a function of radial and angular position on the disk. These factors result in a large relative axial velocity between the different data layers, which varies as a function of the disk radial and angular positions.

What is needed is a multiple data layer optical disk drive that has a reliable and accurate system for positioning the focused laser spot from one data layer to another to rapidly access the data on the different data layers.

SUMMARY OF THE INVENTION

The invention is an optical disk drive with a multiple data layer optical disk and a system that uses computed axial velocity values of the data layers to optimize the interlayer transition of the focused light beam. In the preferred embodiment, the axial velocities of the data layers are computed for a set of radial and angular positions on the data layer surfaces using one of several techniques. The data layer axial velocity values are computed from the measured current values to the voice coil motor focus actuator or from the output of the detector that generates the focus error signal (FES). A routine is run at disk drive startup, or at various times during disk drive operation, to measure the coil current or FES at different radial and angular positions and compute the axial velocity values. The computed axial velocity values are then mapped into memory storage according to addresses corresponding to their radial and angular positions. When it is desired to move the focused light beam from one data layer (the initial or take-off data layer) to another data layer (the final or target data layer) the computed axial velocity values are retrieved for the radial and angular positions nearest the take-off and target sectors on the respective data layers. These velocity values are then used to modify the acceleration profile of the focusing lens so that the focused light beam arrives at the desired position on the target data layer with a velocity close to the target data layer axial velocity. The acceleration profile is modified so that the difference between the lens arrival velocity and the target data layer axial velocity is less than a predetermined critical capture velocity. In an alternative embodiment the relative velocity between the target data layer and the lens is computed in real time by measurement of the times that the FES reaches predetermined levels during a constant acceleration of the lens, and this real-time computed value is then used to modify the acceleration profile of the lens.

For a fuller understanding of the nature and advantages of the present invention, reference should be made to the following detailed description taken in conjunction with the accompanying figures.

DESCRIPTION OF THE PREFERRED EMBODIMENTS

Overview of the Optical Disk Drive with Multiple Data Layers

Figure 1:
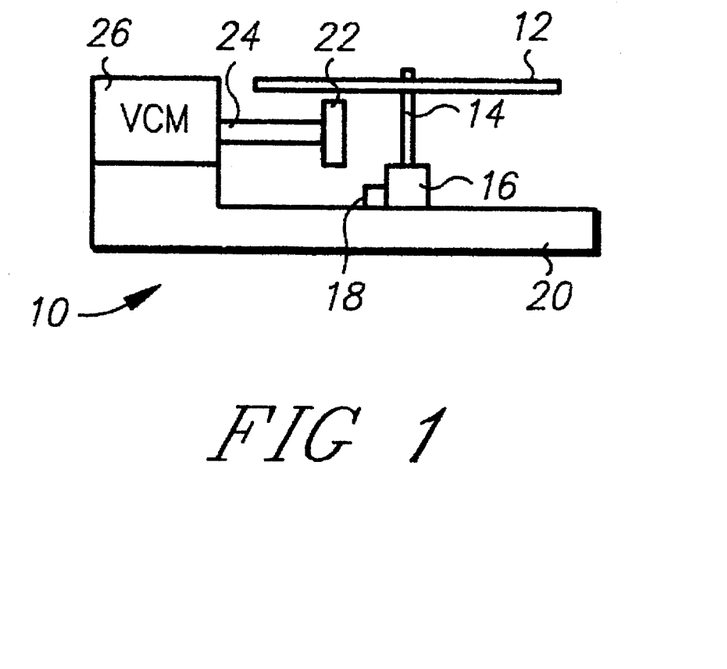
FIG. 1 is a schematic diagram of an optical disk storage system of the present invention in the form of a CD-ROM system.

FIG. 1 shows a schematic diagram of an optical disk storage system designated by the general reference number 10. System 10 will be explained in terms of a CD-ROM optical system. System 10 includes an optical data storage medium 12 which is preferably disk shaped and removably mounted on a clamping spindle 14 as is known in the art. Spindle 14 is attached to a spindle motor 16, which in turn is attached to a system chassis 20. A shaft encoder 18 on spindle motor 16 provides information on the angular position of the spindle motor. Disk motor 16 rotates spindle 14 and medium 12.

An optical head 22 is positioned below medium 12. Head 22 is attached to an arm 24, which in turn is connected to an actuator device such as a voice coil motor (VCM) 26. VCM 26 is attached to chassis 20 and moves arm 24 and head 22 in a radial direction below medium 12.

Figure 2:
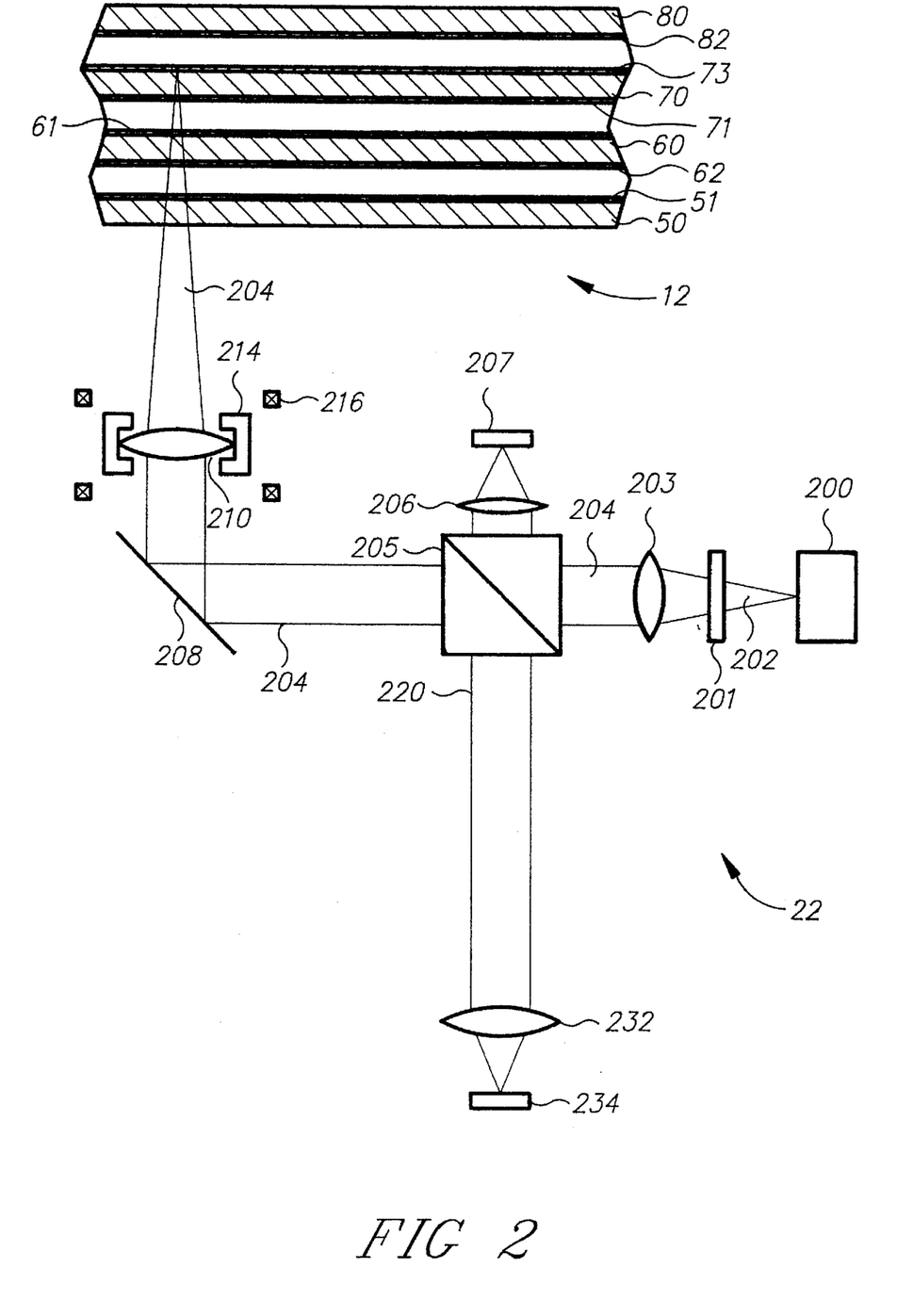
FIG. 2 is a schematic diagram of the optical head and medium of the present invention illustrating the means for focusing the laser beam to different data layers and for detecting the reflected light.

FIG. 2 shows a schematic diagram of one embodiment of the optical head 22 and medium 12 of FIG. 1. Optical head 22 includes a laser diode 200, which may be a gallium-aluminum-arsenide diode laser producing a primary beam of light 202 at approximately 780 nanometers wavelength. Other types of lasers are available that produce light at shorter wavelengths. Beam 202 is first diffracted by grating 201 to produce two secondary beams for tracking, in addition to the primary data beam, and then collimated by lens 203. The resulting threecomponent beam 204 then passes to a beamsplitter 205. A portion of beam 204 is reflected by beamsplitter 205 to a focus lens 206 and an optical detector 207. Detector 207 is used to monitor the power of laser beam 204. Beam 204 from beamsplitter 205 next passes to and is reflected by a mirror 208. Beam 204 then passes through a focus lens 210 and is focused onto one of the data layers (layer 71 of substrate 70 as shown) of medium 12. Lens 210 is mounted in a holder 214, the position of which is adjusted relative to medium 12 by a focus actuator motor 216, which may also be a VCM. Medium 12 in FIG. 2 is a multiple data layer medium of the type having individual substrates spaced apart and separated by air gaps. However, the present invention is also applicable to the laminated type of multiple data layer medium as will be explained below.

A portion of the light beam 204 is reflected at the data layer 71 as a reflected beam 220. Beam 220 returns through lens 210 and is reflected by mirror 208. At beamsplitter 205, beam 220 is directed through an astigmatic lens 232 and onto a multielement optical detector 234. The tracking error signal (TES), focus error signal (FES), and data signals are generated from the output of detector 234 and then amplified by an amplifier 236 (FIG. 3).

Figure 3:
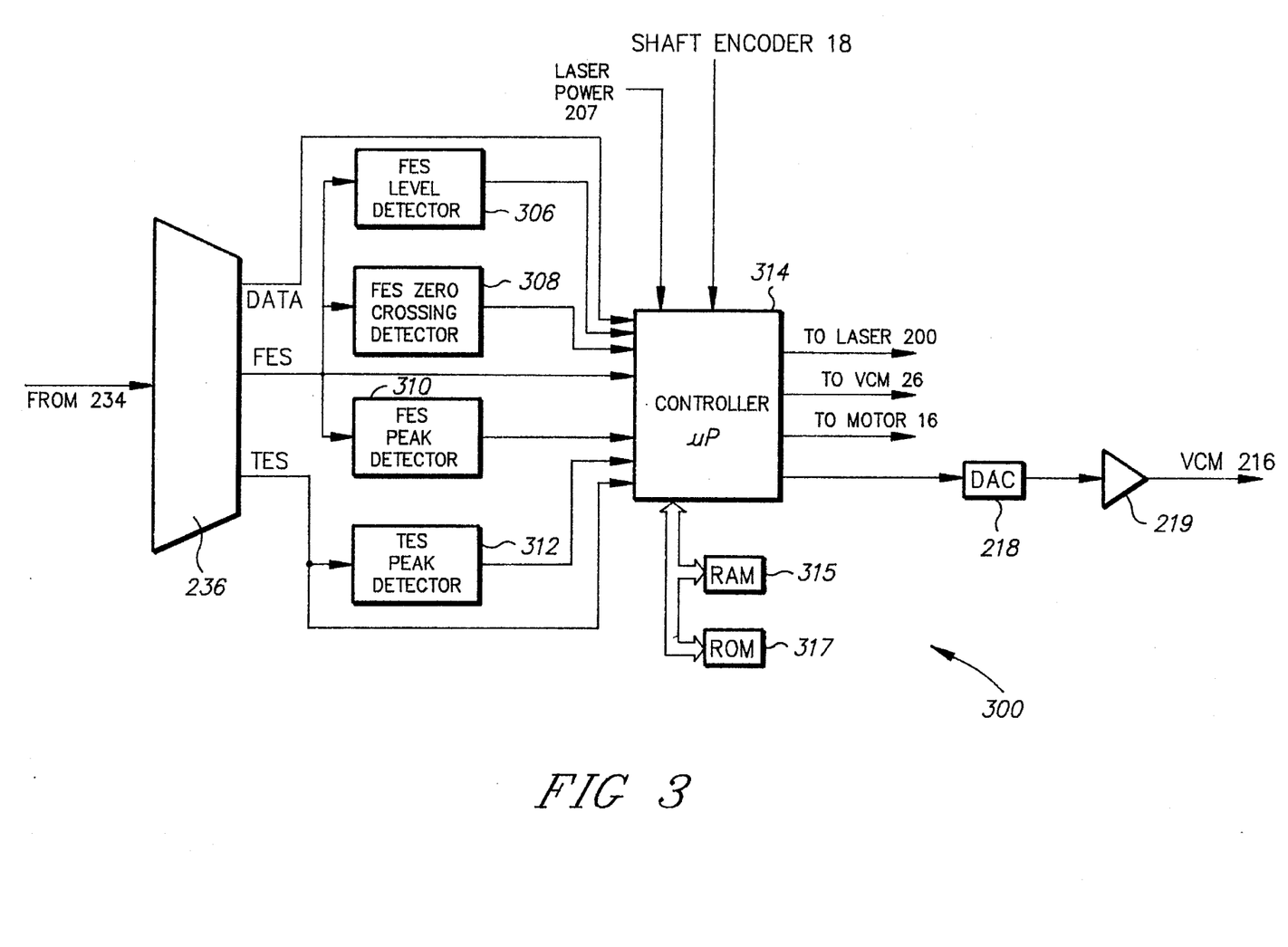
FIG. 3 is a block diagram of the controller system of the present invention.

FIG. 3 is a block diagram of the controller system of the present invention and is designated by the general reference number 300. A FES level detector 306, FES zero crossing detector 308 and FES peak detector 310 receive the FES amplified by amplifier 236. A TES peak detector 312 receives the TES. The multielement detector 234 generates output signals that are amplified by signal amplifier 236 and used to generate the data signal, the TES, and the FES, each of which is digitized (not shown) and sent to controller 314. Controller 314 also receives input signals from FES level detector 306, zero crossing detector 308, peak detector 310, TES peak detector 312, the disk motor 16 shaft encoder 18, and laser power detector 207. Controller 314 is also connected to and controls the laser 200, optical head VCM 26, and disk motor 16. The controller 314 also provides control signals to a digital-to-analog converter (DAC) 218. The output of DAC 218 is amplified by amplifier 219 and sent to focus actuator VCM 216. In the present invention VCM 216 is used to not only focus the optical beam onto each data layer but to move the beam focal spot from one data layer to another. Controller 314 is a microprocessor-based disk drive controller that is connected by an address bus to RAM 315 and ROM 317 memory devices. In the present invention the instructions for the algorithm that enables the microprocessor to obtain the data representative of the velocity values and to calculate the velocity values are stored in ROM 317. The calculated velocity values and their associated radial and angular position data are stored in RAM 315 and addressed by the microprocessor as needed during the running of the algorithm.

Figure 4:
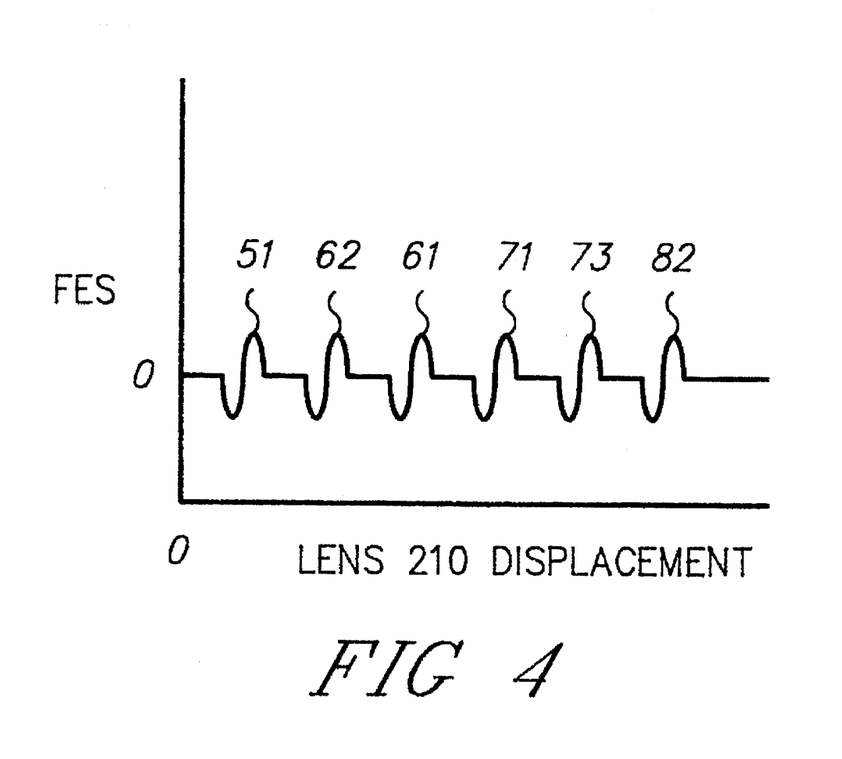
FIG. 4 is a graph of a generic focus error signal (FES) versus lens displacement for the present invention.

FIG. 4 shows a graph of a generic FES versus the displacement distance of lens 210. Note that a nominally sinusoidal focus error signal is obtained for each of the data layers of the air-gap medium 12 when the aberrations introduced by the substrates are properly compensated. During startup of the disk drive, controller 314 first causes motor 216 to position lens 210 at its zero displacement position. Controller 314 will then seek the desired data layer by causing motor 216 to move lens 210 in a positive axial displacement direction. At each data layer, i.e., data layers 51, 62, 61, 71, 73, 82 of disks 50, 60, 70, 80, respectively, peak detector 310 will detect the two peaks of the FES when the focal spot of beam 204 passes through the data layer and the substrate aberrations are properly compensated. Controller 314 counts the peaks and determines the exact data layer on which beam 204 is focused. Alternatively, the specific data layer may be identified by reading an embossed identification marker on each data layer. When the desired data layer is reached, controller 314 causes motor 216 to position lens 210 such that the FES is between the two peaks for that particular data layer. The FES is then used to control the motor 216 to seek the zero point FES between the peaks, i.e., lock on the positive slope signal such that exact focus is achieved. The controller 314 will also adjust the power of laser 200 for that particular data layer.

Figure 5A:
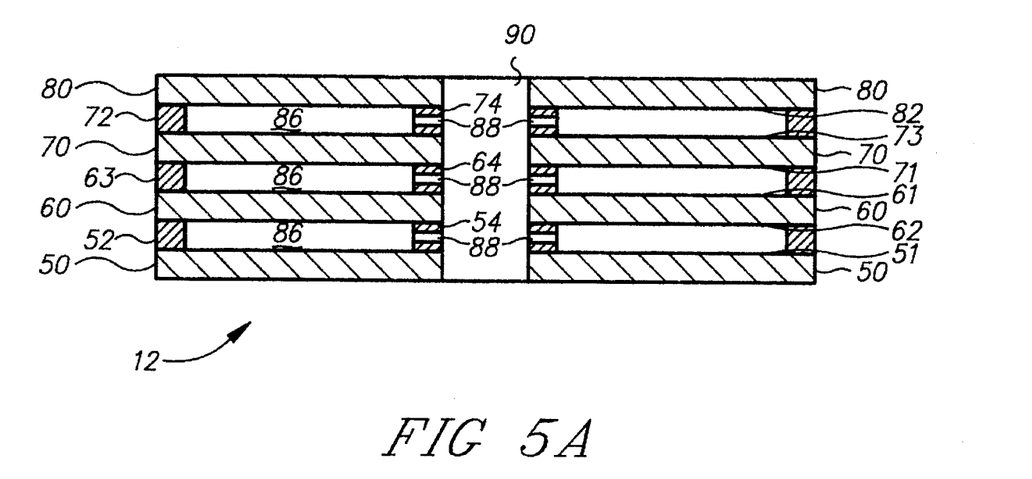
FIG. 5A is a sectional view of the air-gap optical medium illustrating the various disk substrates and their data layers.

FIG. 5A is a cross-sectional view of the air-gap optical medium 12 for use in a CD-ROM system. Medium 12 includes four disk substrates 50, 60, 70, and 80. Substrate 50 is the substrate closest to the optical head 22 (FIG. 2) and is where the laser beam enters medium 12. An outer diameter (OD) rim 52 and an inner diameter (ID) rim 54 are attached between substrate 50 and adjacent substrate 60. An OD rim 63 and an ID rim 64 are attached between substrate 60 and adjacent substrate 70, and an OD rim 72 and an ID rim 74 are attached between adjacent substrates 70 and 80. Substrates 50, 60, 70, and 80 are made of a light-transmissive material such as glass, polycarbonate, or other polymer material. The ID and OD rims are also preferably made of a plastic material, such as polycarbonate.

The rims may be attached to the substrates by means of glue, cement, or other bonding process. However, preferably the rims are integrally formed in the substrates during fabrication, such as in the conventional injection molding process for polycarbonate CD-ROM substrates. When in place, the rims form a plurality of annular spaces 86 between the substrates and the face plate. A spindle aperture 90 passes through medium 12 inside the ID rims for receiving the spindle 14. A plurality of passages 88 are provided in the ID rims connecting the aperture and the spaces 86 to allow pressure equalization between the spaces 86 and the surrounding environment of the disk drive, which would typically be air. The passages 88 could alternatively be located on the OD rims.

Figure 5B:
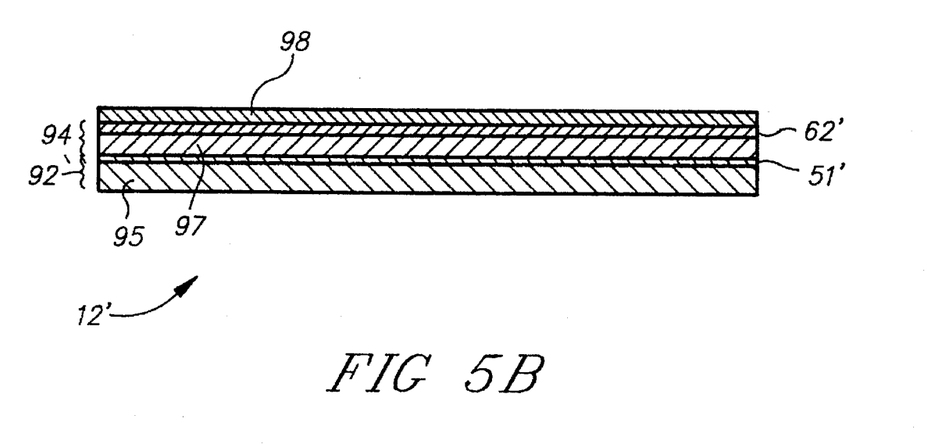
FIG. 5B is a sectional view of the laminated optical medium illustrating the various disk substrates and their data layers.

FIG. 5B is a cross-sectional view of a laminated type optical medium 12' for use with the present invention. The medium 12' is formed as two separate disks 92, 94, each comprising substrates 95, 97 with data layers 51', 62', respectively. Substrate 97 is thinner than substrate 95 and serves essentially as a spacer layer for the data layers 51', 62'. A protective layer 98 is formed over data layer 62'. The medium 12' may be a CD-ROM disk with patterned reflective data layers 62', 51'.

Data Layer Variable Spacing and Axial Velocities

The problem of switching from one data layer to another in the presence of data layers with variable spacing and axial velocities will be explained for the example of moving the focused laser spot from data layer 73 to data layer 82 (FIG. 2). In FIG. 2 the data layers 73 and 82 are shown as being perfectly planar and parallel with a fixed spacing between them. However, in reality each of the data layers is a non-planar generally undulating surface, and adjacent data layers may not have the same surface shape. As a result, the actual spacing d between any two layers is not constant, but can vary as a function of radial and angular position on the disk. Also, as these data layers rotate beneath the laser beam focal spot, they have instantaneous axial velocities that also change, depending on the radial and angular position of the disk. This problem will be stated mathematically for the general case of switching from an initial data layer m to a target data layer n.

Let $V_m(R,\theta)$ be the axial velocity of layer m (e.g., layer 73) and let $V_n(R,\theta)$ be the axial velocity of layer n (e.g., layer 82) at position R and $\theta$. Let $d_s$ be the axial separation between the escape point of the beam focal spot from layer m and the capture point of the beam focal spot on layer n, and $t_f$ the transition time to reach layer n. Let a(t) be the time-dependent acceleration profile of the lens 210 during the interlayer transition. Then the final axial velocity $V_f$ of the lens near layer n is given by:

$$V_f(t) = V_m + \int_0^{t_f} a(t)dt \quad (1)$$

Assume that reliable focus acquisition of data layer n can occur at a critical capture velocity $V_c$ which is the relative velocity between the lens 210 and the target data layer n. Then for all cases where the difference between the lens final or arrival velocity and the target data layer axial velocity is less than $V_c$, reliable focus acquisition will occur. This implies the following condition for reliable interlayer transition:

$$0 < V_f - V_n < V_c \quad (2)$$

$$0 < V_m - V_n + \int_0^{t_f} a(t)dt < V_c$$

where $t_f$ is the transition time. It is clear from this expression that the optimal lens acceleration profile depends critically on $V_m$, $V_n$, and $d_s$, each of which can vary considerably across a data layer and from one data layer to another. Knowledge of these parameters, even in an approximate fashion, leads to reliable and rapid interlayer transition.

In the present invention, several methods and systems for achieving this are described.

Mapping of Velocities Using Focus Actuator Current

The velocity of a data layer can be measured from the time-dependent current I(t) delivered to the focus actuator, i.e., the coil of VCM 216. In general, the axial velocity $V_z(R,\theta)$ can be calculated from I(t) using the transfer function of the focus actuator. This can be done in the drive microprocessor. For the case where the axial runout of a data layer varies slowly compared to the response time of the focus actuator, which is a realistic assumption for conventional disks and drives, the calculation is straightforward. For a simple harmonic oscillator:

$$V_z = C dI/dt \quad (3)$$

where C is a constant depending on the focus actuator design.

This velocity information is computed by the microprocessor and stored in RAM 315 as a map of axial velocity values as a function of R,$\theta$. The mapping of this information at 5 different radii and 10 angular positions for each radius will provide a sufficient map, although the use of more data points is feasible. This would require 50 data points per disk surface. Assuming 10 data layers and 2 bytes of information to describe the velocity of a given surface at a given R,$\theta$, then the total storage necessary for a map of all 10 data layers is 2×50×10=1 KByte.

Procedure for Focus Actuator Current Mapping

The following is a description of the algorithm for calculating the individual local axial velocities and mapping them into RAM 315 for later recall by the microprocessor when doing interlayer switching:
1. Start disk drive.
2. Acquire first data layer.
3. Verify it is first data layer by reading data sector headers.
4. If it is not first layer, retry acquisition of first data layer.
5. Map $V_z$ using current to VCM 216.
   Move optical head to radius R using VCM 26.
   Determine R,$\theta$ by reading sector headers (shaft encoder 18 may also be used to provide $\theta$).
   Obtain digital current value I to DAC 218.
   Calculate $V_z$ using equation (3).
   Store $V_z$, and R,$\theta$ in RAM 315.
   Repeat for different $\theta$ values.
   Move optical head to another R and repeat.
6. Acquire second data layer. (Use first data layer $V_z$ table to modify acceleration profile of VCM 216. Initially, assume data layer 2 has same $V_z$ table as the first data layer).

7. Verify it is second data layer by reading data sector headers.
8. If it is not second data layer, retry acquisition of second data layer.
9. Map $V_z$ like first data layer.
10. Continue mapping $V_z$ to all data layers.

Figure 6:
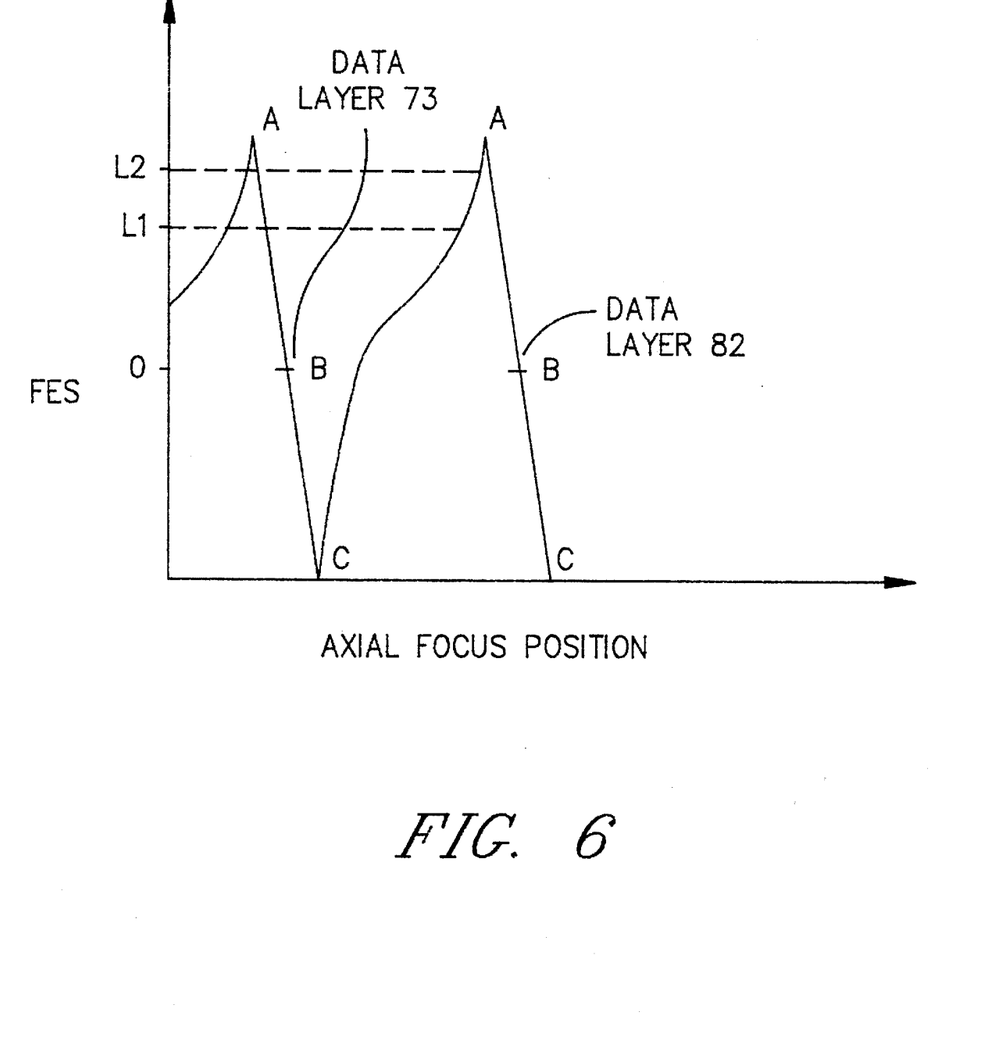
FIG. 6 is a graph of an astigmatic focus error signal (FES) as a function of lens position as the laser beam focal spot is moved axially through the data layers.

Mapping of Data Layer Positions and Velocities Using FES Peaks and Zero Crossings A map of the axial velocity of each data layer as a function of $R,\theta$ can be obtained by the expression:

$$V_z = \omega \frac{Z_2 - Z_1}{\theta_2 - \theta_1} \quad (4)$$

where $\omega$ is the angular velocity of the disk, and $Z_2$, $Z_1$ are the axial positions of the data layer at angular positions $\Theta_2$, $\Theta_1$, respectively, for a fixed R. The axial positions, Z, of the various data layers can be mapped using the focus error signal (FES) from the drive, as shown in FIG. 6 for a schematic astigmatic FEB. The portions of the curve of FIG. 6 representing each of the data layers 73, 89. (FIG. 2) is the typical output from a conventional astigmatic focusing system, such as that used in conventional CD-ROM drives. The positions of the data layers are determined by the zero crossing point B from the lower peak A to the upper peak C for each associated data layer 73, 82 as the laser beam focal spot moves axially through the data layers. While the disk is rotating, the lens 210 is moved rapidly in the axial direction with a constant acceleration. The positions of the data layers are determined by the FEB zero crossing detector 308 (FIG. 3) in the manner described below. This process is repeated for different $\theta$ positions around the disk and for different radii R. This position information is stored in RAM 315 and used to make a map of the axial velocities of all the data layers using equation 4. This map is converted into an axial velocity map $V_z$ and stored as a function of disk $R,\theta$ position and layer number. When an interlayer transition occurs between layer m and layer n at a given $R,\theta$ on the disk surface, the initial velocity $V_m$ of layer m, the final velocity $V_n$ of layer n, and the interlayer spacing determined from the respective Z values, are provided to the controller 314 which modifies the appropriate acceleration profile for the lens 210 for a rapid and reliable interlayer transition.

Procedure for Mapping Positions and Velocities Using FES Peaks and Zero Crossings The following is a description of the algorithm for calculating the individual local data layer positions and axial velocities from the FES zero crossings and mapping them into RAM 315 for later recall by the microprocessor when doing interlayer switching:

1. Start drive but keep focus actuator VCM 216 in rest position.
2. Move optical head to radius R using VCM 26.
3. Determine $\theta$ position from shaft encoder 18.
4. Apply fixed current to VCM 216 to give approximately constant axial acceleration $\alpha$ to lens 210 to move the beam focal spot through all the data layers. (Although the disk is rotating, the axial movement of the lens is so rapid that it is accurate to assume that the lens passes through all the data layers at essentially the same angular position $\theta$.)
5. Use FES peak detector 310 and FES zero crossing detector 308 to determine the times $t_A$, $t_C$ for the occurrence of the lower and upper FES peaks, respectively, and $t_B$ for the time of the FES zero crossing for all the data layers as the lens moves the beam focal spot through the layers. (The FES zero crossing point B occurs when the beam is focused on a data layer, such as data layer 82 in FIG. 6).
6. Store the $t_A$, $t_B$, $t_C$ values as a function of $R,\theta$ in RAM 315 for each data layer.
7. Use the times $t_A$, $t_C$ to determine the average velocity of the lens, $V_{LENS}$, as a function of $R,\theta$ for each data layer. Since the peaks A and C are separated by a known fixed distance $d_p$, and the lens is accelerating at a constant acceleration, the velocity of the lens at the data layer is the average velocity of the lens between its travel from A to C. Thus $V_{LENS}=d_p/(t_C-t_A)$.
8. Calculate actual lens acceleration a from knowledge of $V_{LENS}$ at two different data layers. Since acceleration is the change in velocity as a function of time then:

$$a=[V_{LENS}(m)-V_{LENS}(n)]/[t_B(m)-t_B(n)] \quad (5)$$

where m and n represent two data layers. The lens acceleration does not need to be calculated as a function of $R,\theta$, although several calculations could be made and averaged to arrive at the value to use.
9. Knowing the lens acceleration and the data layer crossing times $t_B$, the axial positions Z of all the data layers as a function of $R,\theta$ can be calculated. The data layer position Z for a data layer m at a single $R,\theta$ location is given by:

$$Z(m)=\tfrac{1}{2}at_B^2(m) \quad (6)$$

10. From the axial positions of the data layers as calculated in equation (6), it is straightforward to calculate data layer separations (e.g., $Z_2-Z_1$) and $V_z$ as a function of $R,\theta$ using equation (4).
11. Store Z and $V_z$ as a function of $R,\theta$ for all the data layers.
12. Return focus actuator VCM 216 to rest position.
13. Repeat process for different R and $\theta$.

Real-time Axial Position and Velocity Measurement Using FES

The FES curve can be measured in real time as the lens makes a transition from one data layer to another. The information on the amplitude and slope of the FES curve shown in FIG. 6 can be used to determine the axial position and velocity of the lens relative to the data layer for which focus is acquired as the beam focal spot approaches a data layer. This information is then used to adjust the acceleration profile of the actuator in real time. One implementation of this is as follows:

1. Start drive.
2. Acquire focus on data layer 73.
3. Verify focus on layer 73 by reading sector headers.
4. Receive request for data on data layer 82.
5. Apply conventional bang-bang acceleration profile to VCM 216 assuming no relative velocity between data layers 73, 82.
6. As the lens approaches data layer 82, use level detectors 306 (FIG. 3) to determine the times $t_{L1}$, and $t_{L2}$ when levels L1 and L2, respectively, occur on the FES curve shown in FIG. 6. These levels represent known distances from the data layer 82 so that the time difference divided by this known distance differential D is the velocity of the lens relative to the data layer, i.e., $V_r=D/(t_{L2}-t_{L1})$.
7. Modify the bang-bang acceleration profile to achieve relative velocity $V_r$ less than the critical velocity $V_c$.

While in this real time relative velocity measurement embodiment the FES is the preferred signal to detect as the focal spot approaches the target layer, the invention would also work with the use of the TES as the detected signal.

Use of Position and Velocity Values to Modify Focus Actuator Acceleration Profile With the stored map of data layer axial position and velocity values as a function of R,θ, the lens can be accurately and rapidly moved from any one data layer to another to focus the laser beam on the target data layer.

Assume a conventional bang-bang acceleration profile to perform the interlayer transitions.

If each data layer was flat without any axial deflections or relative velocities, then the bang-bang acceleration profile would be as follows:

1. A constant acceleration, α, for a time $t_1$.
2. A constant deceleration, $-\alpha$, of the same value for time $t_2$. The times $t_1$ and $t_2$ are chosen so that after the deceleration, the relative velocity $V_r$ is comfortably less than the critical velocity $V_c$ for the focus acquisition of the target data layer. Also, the distance traveled by the lens during the acceleration and deceleration, which is designated $d_r$, is chosen less than the separation distance $d_s$ between the initial and final data layers.
3. Calculate ds by retrieving the axial positions of the take-off and target data layers for the their respective R,θ positions; $d_s=|Z(n)-Z(m)|$. Select $d_r$ less than $d_s$.

With these assumptions, the times $t_1$ and $t_2$ can be calculated from α, $d_r$, and $V_r$ by the following formulas:

$$t_1 = \sqrt{\frac{V_r^2 + 2d_r a}{2a^2}} \quad (7)$$

$$t_2 = t_1 - V_r/a$$

If a transition is between layer m and layer n and the layers are not flat and have axial velocities $V_z(m)$ and $V_z(n)$, respectively, then in order to get a residual velocity $V_r$, the times $t_1$ and $t_2$ are given as follows:

$$t_1 = \sqrt{\frac{(V_r - \Delta V)^2 + 2d_r a}{2a^2}} \quad (8)$$

$$t_2 = t_1 - (V_r - \Delta V)/a$$

The parameters $V_z(m)$ and $V_z(n)$ are determined using the techniques described above.

In actual operation, when the controller 314 receives a command to move from the present data layer to a sector address on another data layer, it extracts the appropriate velocity values $V_z(m)$ and $V_z(n)$ from RAM 315 using the known present and target values of R,θ. These values are then used to perform the calculation of $t_1$ and $t_2$, which are then used in the acceleration profile to apply the predetermined acceleration value for those calculated times.

In the present invention knowledge of the axial velocity of the lens at the initiation of the interlayer transition and the velocity of the target data layer at the R,θ target position are used to rapidly acquire focus on the target data layer. A special case of the present invention makes use of the fact that if the transition is made precisely one disk rotation later (i.e., R,θ is the same for data layers m and n), then the relative axial velocity between the two data layers is expected to be small. Then by assuming that the target data layer has the same axial velocity as the initial data layer, the difference between the arrival velocity of the lens and the target data layer axial velocity will be less than the critical capture velocity. This is especially the case for the laminated multiple data layer medium where the separation between any two data layers is approximately constant so that the axial runout at any given R,θ for both data layers will be approximately the same.

While the preferred embodiments of the present invention have been illustrated in detail, it should be apparent that modifications and improvements may be made to the invention without departing from the spirit and scope of the invention as described in the following claims.

What is claimed is:

1. An optical disk data storage system comprising:
   an optical disk comprising a plurality of axially spaced-apart data layers;
   a disk motor for rotating the disk about an axis;
   a light source;
   a lens for generating a focused light beam from the source;
   a lens motor connected to the lens for moving the lens in an axial direction generally perpendicular to the data layers, whereby the light beam can be focused to different data layers;
   a radial actuator connected to the lens motor for moving the lens motor and connected lens generally radially relative to the disk so the focused light beam can be moved to different radial positions on the data layers; and
   a controller coupled to the lens motor for computing a value representative of an axial velocity of a data layer and for controlling movement of the lens motor in response to the computed axial velocity value; whereby the focused light beam can be moved from one data layer to arrive at a second data layer regardless of the axial velocity of said second data layer.

2. The system according to claim 1 wherein the controller includes means for computing values representative of axial velocities of the data layers at a plurality of radial and angular positions and further comprising a memory storage coupled to the controller for storing the computed velocity values.

3. The system according to claim 2 further comprising a detector for generating a focus error signal representative of the deviation of the focused light beam from a data layer, and wherein the computing means includes means for computing the axial velocity values based on peaks and zero crossings of the focus error signal.

4. The system according to claim 2 wherein the controller includes means for accelerating the lens at a predetermined rate for a first time period and for thereafter decelerating the lens at said predetermined rate for a second time period, said first and second time periods being determined from the computed axial velocity values.

5. The system according to claim 2 wherein the lens motor is a voice coil motor and wherein the computing means includes means for determining values of coil current when the focused light beam is at corresponding different radial and angular positions on the data layers, the axial velocity values being computed based on the determined coil current values.

6. The system according to claim 1 wherein the value representative of the axial velocity of a data layer is the relative velocity between the data layer and the lens as the lens is moving toward the data layer.

7. The system according to claim 1 further comprising a detector for generating a focus error signal representative of the deviation of the focused light beam from a data layer and a level detector for determining the times when the focus error signal reaches two different signal levels, and wherein the axial velocity value is the relative velocity between the data layer and the lens and is computed based on said determined times.

8. The system according to claim 1 wherein the means for controlling movement of the lens motor includes means for moving the focused light beam from one data layer to said second data layer in substantially the same time as the time for the disk to make one revolution; whereby the focused light beam is moved from a radial and angular position on said one data layer and arrives at said second data layer at substantially the same radial and angular position.

9. The system according to claim 1 wherein the disk comprises a plurality of disk substrates, each substrate having a data layer thereon, and means for supporting the substrates in a spaced-apart relationship with an air gap between adjacent substrates.

10. The system according to claim 1 wherein the disk is a laminated structure with no air gap between adjacent data layers.

11. An optical disk data storage system comprising:

an optical disk having a central axis generally perpendicular to the disk, the disk comprising first and second axially spaced-apart data layers;

a disk motor for rotating the disk about the central axis;

a light source;

a lens for generating a focused light beam from the source;

a lens motor connected to the lens for moving the lens in an axial direction generally perpendicular to the data layers, whereby the light beam can be focused on the first data layer, moved to the second data layer and focused on the second data layer;

a radial actuator connected to the lens motor for moving the lens motor and connected lens generally radially relative to the disk so the focused light beam can be moved to different radial positions on the data layers;

a microprocessor coupled to the lens motor for generating signals to the lens motor representative of an acceleration profile for the lens to move the light beam from the first data layer to the second data layer, the microprocessor including means for computing values representative of axial velocities of the data layers at a plurality of radial and angular positions on the data layers; and a memory storage coupled to the microprocessor for storing a map of the computed axial velocity values according to said radial and angular positions, whereby the microprocessor retrieves the stored axial velocity values and modifies the lens acceleration profile in response to the retrieved axial velocity values when the light beam is to be moved from the first data layer to the second data layer.

12. The system according to claim 11 wherein the lens motor is a voice coil motor and wherein the microprocessor includes means for determining values of coil current when the focused light beam is at corresponding different radial and angular positions on the data layers, the axial velocity values being computed based on the determined coil current values.

13. The system according to claim 11 further comprising a detector for generating a focus error signal representative of the deviation of the focused light beam from a data layer, and wherein the microprocessor computes the axial velocity values based on the times of the peaks and zero crossings of the focus error signal.

14. The system according to claim 11 wherein the acceleration profile for the lens is a bang-bang acceleration profile for accelerating the lens at a predetermined rate for a first time period and for thereafter decelerating the lens at said predetermined rate for a second time period, and wherein the microprocessor computes said first and second time periods from retrieved axial velocity values.

15. The system according to claim 11 wherein the disk comprises a plurality of disk substrates, each substrate having a data layer thereon, and means for supporting the substrates in a spaced-apart relationship with an air gap between adjacent substrates.

16. The system according to claim 11 wherein the disk is a laminated structure with no air gap between adjacent data layers.

17. An optical disk data storage system comprising:

an optical disk having a central axis generally perpendicular to the disk, the disk comprising first and second axially spaced-apart data layers;

a disk motor for rotating the disk about the central axis;

a light source;

a lens for generating a focused light beam from the source;

a lens motor connected to the lens for moving the lens in an axial direction generally perpendicular to the data layers, whereby the light beam can be focused on the first data layer, moved to the second data layer and focused on the second data layer;

a radial actuator connected to the lens motor for moving the lens motor and connected lens generally radially relative to the disk so the focused light beam can be moved to different radial positions on the data layers;

a detector for receiving light reflected from the data layers for generating a focus error signal representative of the deviation of the focused light beam from a data layer;

a signal level detector coupled to the reflected light detector for determining the times when the focus error signal reaches two different signal levels; and a microprocessor coupled to the signal level detector and the lens motor for generating signals to the lens motor representative of an acceleration profile for the lens to move the light beam from the first data layer to the second data layer, the microprocessor including means for computing from the signal level detector output the velocity of the lens relative to the second data layer as the light beam moves from the first data layer to the second data layer, whereby the acceleration profile is modified by the microprocessor in response to said computed relative velocity.

18. The system according to claim 17 wherein the disk comprises a plurality of disk substrates, each substrate having a data layer thereon, and means for supporting the substrates in a spaced-apart relationship with an air gap between adjacent substrates.

19. The system according to claim 17 wherein the disk is a laminated structure with no air gap between adjacent data layers.

20. An optical disk data storage system comprising:

an optical disk having a central axis generally perpendicular to the disk, the disk comprising first and second axially spaced-apart data layers;

a disk motor for rotating the disk about the central axis;

a light source;

a lens for generating a focused light beam from the source;

a lens motor connected to the lens for moving the lens in an axial direction generally perpendicular to the data layers, whereby the light beam can be focused on the first data layer, moved to the second data layer and focused on the second data layer;

a radial actuator connected to the lens motor for moving the lens motor and connected lens generally radially relative to the disk so the focused light beam can be moved to different radial positions on the data layers;

a microprocessor coupled to the lens motor for generating signals to the lens motor representative of a bang-bang acceleration profile to accelerate the lens toward the second data layer at a predetermined rate for a first time period and to thereafter decelerate the lens at said predetermined rate for a second time period, the sum of said two time periods being substantially the same as the time for the disk to make one revolution; whereby the focused light beam is moved from a radial and angular position on said first data layer and arrives at said second data layer at substantially the same radial and angular position.

21. The system according to claim 20 wherein the disk comprises a plurality of disk substrates, each substrate having a data layer thereon, and means for supporting the substrates in a spaced-apart relationship with an air gap between adjacent substrates.

22. The system according to claim 20 wherein the disk is a laminated structure with no air gap between adjacent data layers.

23. An optical disk data storage system comprising:

an optical disk having a central axis generally perpendicular to the disk, the disk comprising first and second axially spaced-apart data layers;

a disk motor for rotating the disk about the central axis;

a light source;

a lens for generating a focused light beam from the source;

a lens motor connected to the lens for moving the lens in an axial direction generally perpendicular to the data layers, whereby the light beam can be focused on the first data layer, moved to the second data layer and focused on the second data layer;

a radial actuator connected to the lens motor for moving the lens motor and connected lens generally radially relative to the disk so the focused light beam can be moved to different radial positions on the data layers;

a detector for receiving light reflected from the data layers for generating a focus error signal representative of the deviation of the focused light beam from a data layer; and a microprocessor coupled to the detector and the lens motor for generating signals to the lens motor representative of an acceleration profile for the lens to move the light beam from the first data layer to the second data layer, the microprocessor including means for computing from the focus error signal the velocity of the lens relative to the second data layer as the light beam moves from the first data layer to the second data layer, whereby the acceleration profile is modified by the microprocessor in response to said computed relative velocity.

* * * * *